No. 640,342. Patented Jan. 2, 1900.
C. P. WILKINSON.
CLOTHES LINE REEL.
(Application filed Feb. 27, 1899.)
(No Model.)
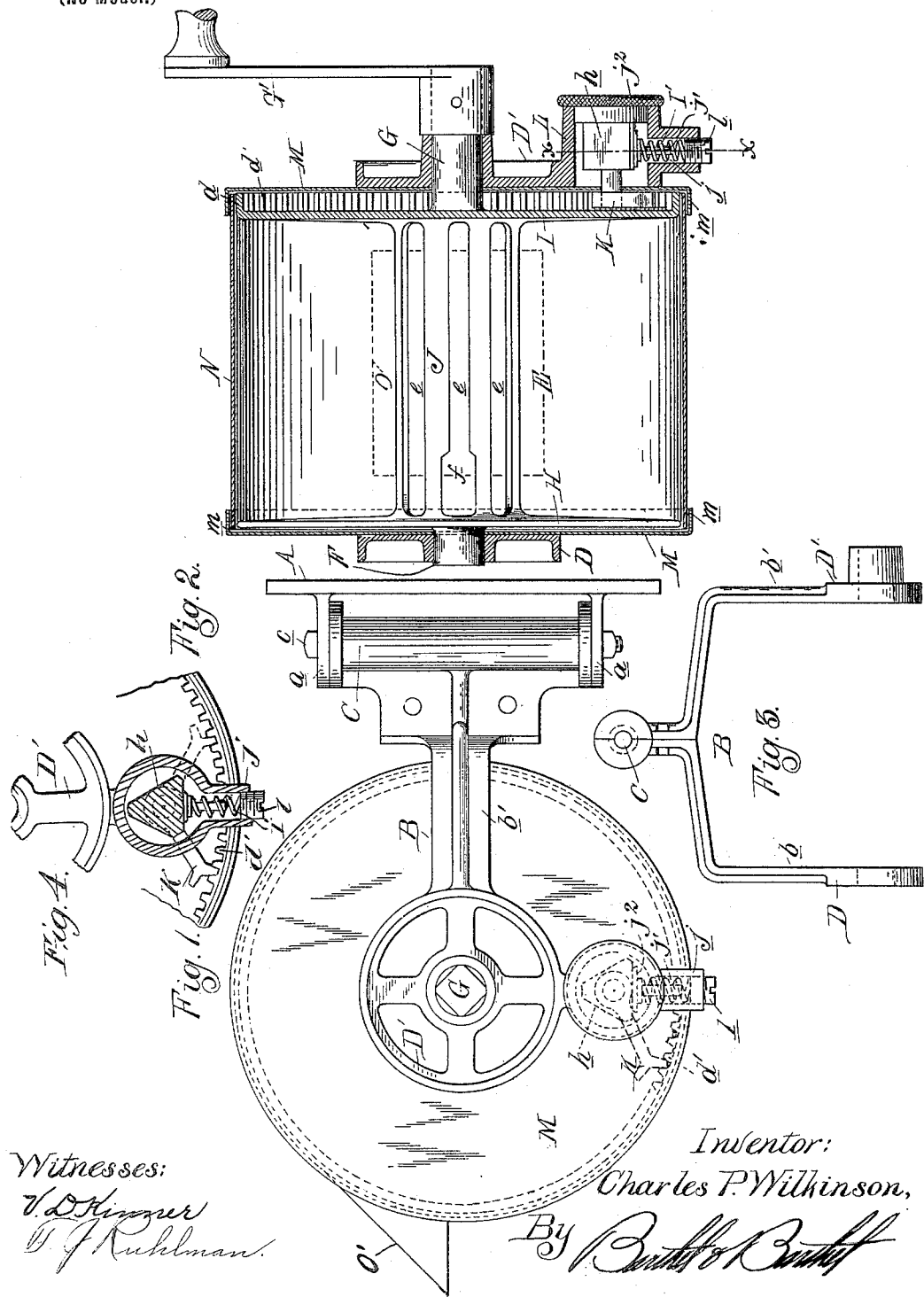
Witnesses:
V. D. Kinzer
T. J. Ruhlman
Inventor:
Charles P. Wilkinson,
By Bertholf & Bertholf
Attorneys.

UNITED STATES PATENT OFFICE.

CHARLES P. WILKINSON, OF DETROIT, MICHIGAN.

CLOTHES-LINE REEL.

SPECIFICATION forming part of Letters Patent No. 640,342, dated January 2, 1900.

Application filed February 27, 1899. Serial No. 706,925. (No model.)

*To all whom it may concern:*

Be it known that I, CHARLES P. WILKINSON, a citizen of the United States of America, residing at Detroit, in the county of Wayne and State of Michigan, have invented certain new and useful Improvements in Clothes-Line Reels, of which the following is a specification, reference being had therein to the accompanying drawings.

My invention relates to new and useful improvements in clothes-line reels, and has for its object to produce a clothes-line reel that may be permanently attached to a post or other convenient place and at the same time protect the line from dirt and weather and be always ready for use.

The invention consists in the improved construction, arrangement, and combination of the various parts, as more fully hereinafter described, and shown in the accompanying drawings, in which—

Figure 1 is a side elevation of my device. Fig. 2 is a vertical section, partly in elevation. Fig. 3 is a plan view of the separable bracket or support for the reel. Fig. 4 is a vertical cross-section on line $x$ $x$, Fig. 2, with the end cap removed.

A is a securing-plate having the ears $a$ preferably formed integrally thereon, said plate being attached to any suitable post or house-corner where it is desired to have the reel.

B is a fork-bracket composed of the two halves $b$ $b'$, secured together by means of suitable bolts, and C is a vertical pivot-bearing jointly formed on the inner end of said bracket and fitting between the ears $a$, a clamping-bolt $c$ passing through the ears on the plate and the bearing, thus securing the parts together in any desired position. The outer ends of the brackets are terminated in circular bosses D D', in which are formed bearings for the trunnions of the reel.

E is the reel, formed with heads H I, having trunnions F G journaled in bearings in the bracket, the trunnion G projecting through its bearing and having a suitable crank-handle G' mounted thereon.

J is the barrel of the reel, having a number of transverse slots $e$ to permit the free circulation of air, a suitable enlargement or opening $f$ being formed in the inner end of one of the slots to permit of the insertion of the knotted end of the clothes-line.

The head I of the reel has formed around its outer edge and at right angles thereto a flange $d$, the inner face of said flange having ratchet-teeth $d'$.

Formed on the outer and lower end of the part $b'$ of the bracket B and cast integrally therewith is a socket L, in which the shaft of the dog K is journaled, the outer end having a knurled knob for operating the dog. The middle portion $h$ of the shaft is formed with three flat faces, and I' is a spring, held in the socket $j$ by means of the screw-plug $l$, adapted to press on the flattened faces of the shaft and hold it in any one of the three positions. I may and preferably do use the pintle $j'$, having a head $j^2$, against the under side of which the spring I' is adapted to press, and thereby hold the dog K in any of its adjusted positions. The dog K has a double tooth so arranged that in one position of the dog it will prevent the winding and in another the unwinding, while in a third position it is thrown out of engagement with the ratchet-teeth. It will thus be seen that with this construction of ratchet the line can be wound in either direction upon the reel.

M are end caps or covers of larger diameter than the heads H I and are provided with inwardly-extending flanges $m$. These covers form the end caps for the housing and are preferably stationarily secured to the inner side of the bosses D D' of the bracket.

N is a cylindrical casing fitting loosely within the flanged portions of the covers M, and O is a rectangular opening in said casing, through which the clothes-line is adapted to pass to the drum of the reel, a suitable flange or hood O' being formed over the opening to prevent the ingress of rain or snow to the interior while the device is in use. However, when the device is not in use and the line has all been wound upon the reel the flanged opening O is turned to the bottom as a further protection from the elements.

The operation of my device is obvious, and it will be seen that my construction obtains the desired objects of the invention.

What I claim as my invention is—

1. In a clothes-line reel, the combination of the reel journaled in the forked ends of the bracket, of a housing having two inwardly-flanged end caps stationarily secured to the outer ends of the bracket and a cylindrical portion revolubly secured between said end caps and provided with a hooded opening.

2. In a clothes-line reel, the combination of the reel formed with trunnions, of the bracket formed with bearings in which the trunnions are journaled, a housing inclosing the reel having two heads fixed to the bracket and the cylindrical casing revolubly supported between said heads.

3. In a clothes-line reel, the combination of the plate A, the forked bracket B adjustably secured on said plate, the two end caps stationarily secured to the ends of the bracket, and the cylindrical casing revolubly supported between said end caps having a hooded opening, the reel inclosed within said housing and having trunnions journaled in the brackets.

4. In a clothes-line reel, the forked bracket B, the two end caps secured to the ends of the bracket, and the cylindrical casing free to turn between said end caps, the reel inclosed within said housing, the flange $d$ formed on one head of the reel within the housing having internal ratchet-teeth, and the dog K journaled in the bracket and inclosed between the reel and housing in operative relation with the ratchet-teeth.

5. In a clothes-line reel, the forked bracket B, the reel E, having trunnions journaled in the ends of said bracket and a flanged portion having ratchet-teeth formed on one of the heads of the reel, the shaft of the dog K journaled in an offset portion formed on one arm of the bracket, said shaft having three flattened faces, and a spring $I'$ adapted to press on one of said flattened faces, and thereby hold the dog in any of its adjusted positions.

In testimony whereof I affix my signature in presence of two witnesses.

CHARLES P. WILKINSON.

Witnesses:
OTTO F. BARTHEL,
ADOLPH BARTHEL.